United States Patent [19]
Otsuka

[11] Patent Number: 4,513,334
[45] Date of Patent: Apr. 23, 1985

[54] HEAD POSITIONING APPARATUS

[75] Inventor: Toru Otsuka, Kanagawa, Japan

[73] Assignee: Sony Corporation, Tokyo, Japan

[21] Appl. No.: 480,068

[22] Filed: Mar. 29, 1983

[30] Foreign Application Priority Data

Apr. 2, 1982 [JP] Japan .................................. 57-54934

[51] Int. Cl.³ ............................................... G11B 5/52
[52] U.S. Cl. ...................................... 360/75; 310/317; 360/77
[58] Field of Search ...................... 360/75, 77, 78, 107; 310/326, 317

[56] References Cited

U.S. PATENT DOCUMENTS

| 3,532,911 | 10/1970 | Roberts et al. | 310/326 |
| 4,223,358 | 9/1980 | Kubota et al. | 360/75 |
| 4,356,522 | 10/1982 | Takano et al. | 360/77 |

FOREIGN PATENT DOCUMENTS

| 55-52529 | 4/1980 | Japan | 360/77 |
| 55-52530 | 4/1980 | Japan | 360/77 |
| 56-61029 | 5/1981 | Japan | 360/75 |
| 56-61030 | 5/1981 | Japan | 360/77 |

Primary Examiner—George G. Stellar
Attorney, Agent, or Firm—Lewis H. Eslinger; Alvin Sinderbrand

[57] ABSTRACT

A head positioning apparatus for an HVTR has two rotary heads mounted to a rotating drum by electrically deflectable bi-morph leaves. To trace tracks on the tape when the tape is played back at a speed different from that used to record it, tracking correction signals are repeatedly applied to the bi-morph leaves to deflect the heads into position to trace the tracks properly. Residual deflection in the bi-morph leaves, when the tracking correction signals terminate at the end of each trace, is removed by a hysteresis-erasing signal that flexes the bi-morph leaf back and forth. The polarity of the hysteresis-erasing signal depends on whether the tape on playback is running faster or slower than the recording speed.

7 Claims, 7 Drawing Figures

FIG. 3
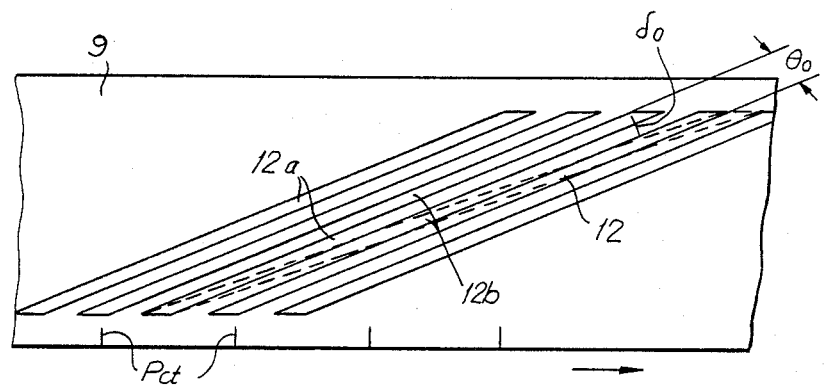
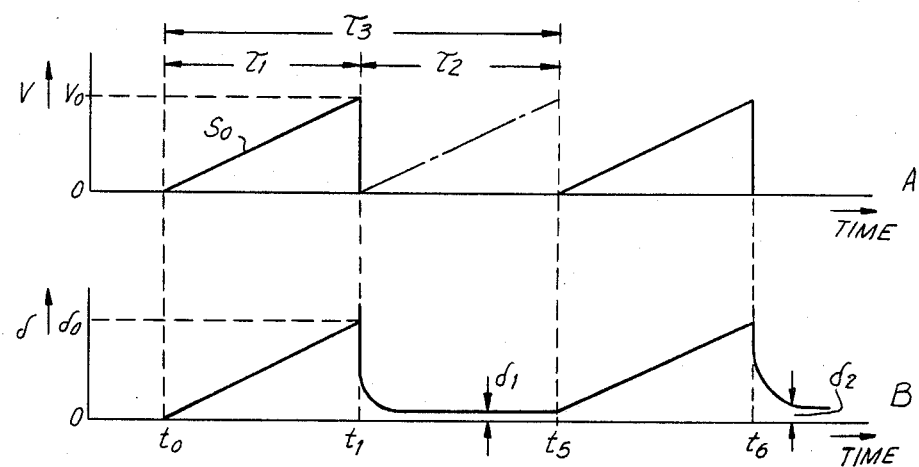
FIG. 4

HEAD POSITIONING APPARATUS

BACKGROUND OF THE INVENTION

1. Field of the Invention

The present invention relates to a head positioning apparatus and, more particularly, to such an apparatus for a helical-scan video tape recorder.

2. Description of the Prior Art

Helical-scan video tape recorders, or HVTR's, record tracks on a magnetic tape using two magnetic heads spaced 180° apart on a rotating disc or drum. The tape is wrapped around about one-half of the periphery of the drum so that each head records or reproduces one track on the tape during about one-half of a revolution of the head. While one head is in contact with the tape, the other is in a "flyback" position. The geometry of the HVTR recording-reproducing system results in the magnetic impression of a plurality of tracks on the tape at an angle to the direction of tape travel.

Accurate reproduction of those tracks requires that each head trace the particular track being reproduced without tracing either adjacent track. In known HVTR's the heads are each mounted to the drum by an electro-mechanical transducer commonly known as a bi-morph leaf. During playback, a voltage can be applied to the bi-morph leaf to deflect it and position the head as the head mounted on the bi-morph leaf scans the tape. If the deflection of the bi-morph leaf is properly controlled, the head mounted thereon will accurately trace the track being reproduced. When the tape speed during reproduction is different from the tape speed during recording, the bi-morph leaf must be deflected a substantial amount. Under such circumstances, mechanical hysteresis can prevent the bi-morph leaf from returning during flyback to a position in which it is properly located for tracing the next track on the tape.

In the prior art a signal has been applied to the bi-morph leaf during flyback to "erase" the mechanical hysteresis. The hysteresis-erase signal usually comprises a decaying, oscillating voltage that flexes the bi-morph leaf back and forth during flyback. The bi-morph leaf is supported to return to its proper position under the influence of the hysteresis-erase signal as the end of flyback approaches so that it can be accurately deflected by a tracking correction signal during the next trace of the tape. Since the period available for erasing the hysteresis is limited, the hysteresis-erase signal has to be of short duration.

The tracking correction signal used to deflect the bi-morph leaf to position the head while it traces the tape must deflect the bi-morph leaf in one direction when playback is faster than the speed at which the tape was recorded and in the other direction when playback is slower than the speed at which the tape was recorded. It has been found that one hysteresis-erase signal of short duration that may be efective when the bi-morph leaf has been deflected in one direction while tracing the tape may not be effective to erase the mechanical hysteresis that occurs when the bi-morph leaf has been deflected in the other direction.

SUMMARY OF THE INVENTION

It is an object of the present invention to provide a head positioning apparatus that overcomes the deficiencies of prior art apparatus for providing hysteresis-erase signals.

It is a another object of the present invention to provide a hysteresis-erase signal having a first polarity when the tape speed is above a predetermined value and a second polarity when the tape speed is below a predetermined value.

In accordance with an aspect of the present invention, a helical-scan tape reproducing device having a rotary transducer for reproducing signals from tracks on a record medium, electrically deflectable mounting means mounting the rotary transducer and positioning signal generating means for applying a positioning electrical signal to the mounting means for deflection thereof, is provided with a hysteresis-erase signal means for applying a hysteresis-erasing electrical signal to the mounting means for deflection thereof to remove residual deflection thereof resulting from deflection by said positioning signal means, and polarity selecting means for selecting the polarity of the hysteresis-erasing signal depending on the direction of deflection of said mounting means by said positioning signal.

The above, and other objects, features and advantages of the present invention, will become apparent from the following detailed description of illustrative embodiments of the invention which is to be read in connection with the accompanying drawings.

BRIEF DESCRIPTION OF THE DRAWINGS

FIG. 3 schematically illustrates a length of magnetic tape having a plurality of tracks recorded thereon with the HVTR shown in FIG. 1 and the tracking error that occurs when the tape is reproduced at a slower speed than that at which it was recorded.

FIGS. 4A and 4B illustrate, respectively, a tracking correction signal applied to one of the bi-morph leaves of the HVTR in FIG. 1 to compensate for the tracking error depicted in FIG. 3 and the deflection of the bi-morph leaf by that tracking correction signal.

DETAILED DESCRIPTION OF ILLUSTRATIVE EMBODIMENTS

Figure 1:
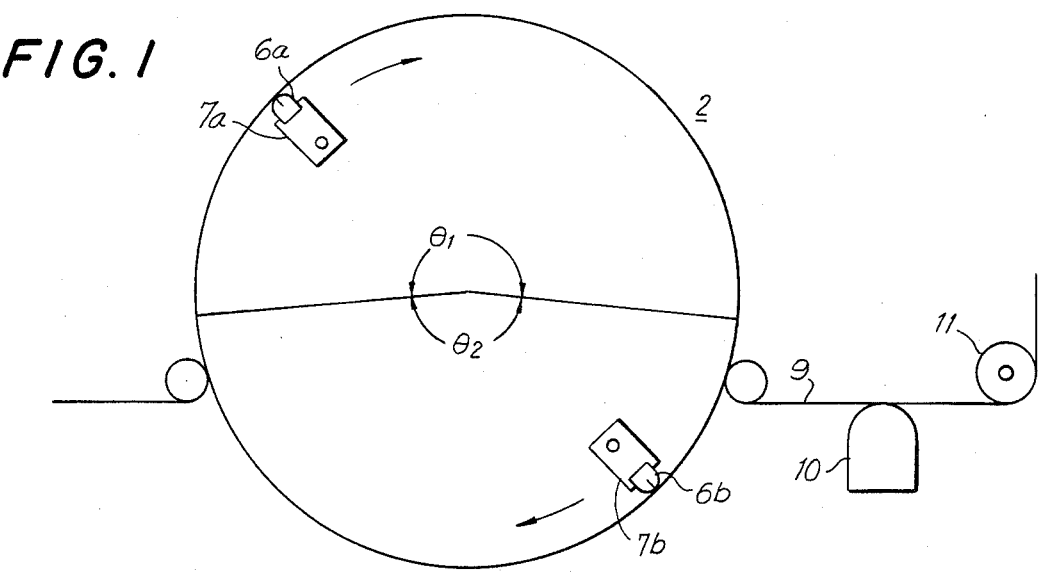
FIG. 1 is a schematic plan view of an HVTR recording/reproducing head with which the head positioning apparatus of the present invention can advantageously be used.
Figure 2:
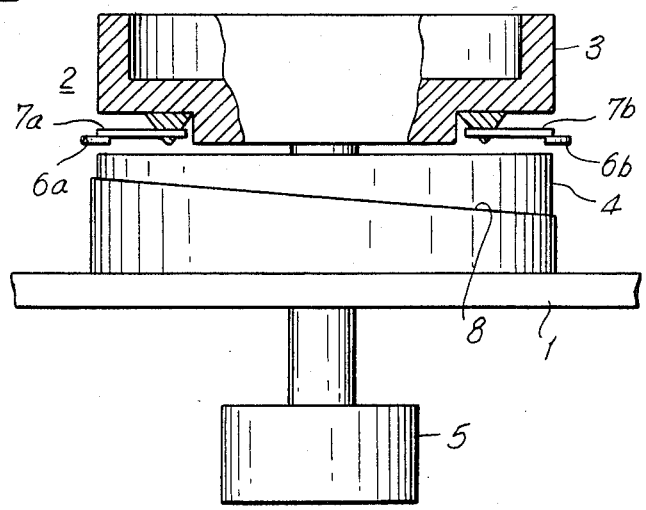
FIG. 2 is a schematic elevation view, partly in section, of the HVTR recording/reproducing head shown in FIG. 1.

As shown in FIGS. 1 and 2, an HVTR to includes a chassis 1, a rotary magnetic head device 2, including an upper rotary drum 3 and a lower fixed drum 4, and a driving device 5, such as a motor. The lower drum 4 is fixed on the chassis 1 and the upper drum 3 is rotated by the driving device 5. A pair of transducers, or magnetic heads, 6a and 6b are mounted on the rotating upper drum 3 by a pair of bi-morph leaves 7a and 7b, respectively. The HVTR includes a tape edge guide 8 on the lower drum 4 for guiding a magnetic tape 9 wrapped around the rotary head device 2. A magnetic head 10 records control pulses on the tape 9 when the HVTR is used in a recording mode and reproduces the control pulses in the playback mode. The magnetic tape 9 is transported around the rotary magnetic head device 2 over an angle slightly larger than 180°. In FIG. 1 the heads 6a and 6b contact the tape 9 through an angle $\theta_1$ slightly larger than 180°. Thus, the heads 6a and 6b are out of contact with the tape 9 through an angle $\theta_2$ equal to $360° - \theta_1$. The magnetic tape 9 drives a tape counter roller 11 that senses the linear speed of the tape 9.

FIG. 3 illustrates the tracks 12 recorded on the magnetic tape 9 by the heads. The head 6a records the tracks 12a and the head 6b records the tracks 12b, which alternate on the tape 9 with the tracks 12a. $P_{ct}$ represents the control pulses which are recorded on and reproduced from the tape 9 by the control head 10. The control head 10 and tape counter roller 11 are used together to regulate the rotational speed of the heads 6a and 6b according to the linear speed of the tape 9 so that the heads 6a and 6b accurately trace the tracks 12a and 12b during playback. Apparatus for recording and reproducing tracks on a tape with an HVTR is known in the art, one example being shown in U.S. Pat. No. 4,356,522, issued Oct. 26, 1982, and assigned to the assignee of the present invention.

FIG. 3 also illustrates the tracking error that will occur when the tape 9 is run at a different speed during reproduction than it was when the tracks 12 were recorded. The tracking error shown in FIG. 3 results when the tape is run slower during playback than during recording. As FIG. 3 shows, if the heads 6a and 6b are not deflected from their normal positions during reproduction, a trace that begins at the proper location (at the bottom of the tape as seen in FIG. 3) will proceed at an angle $\theta_0$ relative to the track, and will result in a tracking error of $\delta_0$ at the end of that particular trace of the head. To correct that tracking error a tracking correction signal is supplied to the bi-morph leaves 7a and 7b to position the heads. FIG. 4A shows the waveform of a typical tracking correction signal $S_0$. During time $\tau_1$, representing the period during which the head traces the tape, the correction signal increases substantially linearly to a voltage $V_0$. When the trace is complete, and for the flyback of the head (period $\tau_1$), the tracking correction signal $S_0$ goes to zero. It repeats itself when the next trace of that head begins at the end of $\tau_2$. The total time for a complete revolution of each head is thus $\tau_1 + \tau_2 = \tau_3$. The tracking correction signal $S_0$ for the other head is shown in phantom lines in FIG. 4A.

FIG. 4B shows the deflection $\delta$ of the head in response to the tracking correction signal $S_0$ shown in FIG. 4A. FIG. 4B also illustrates the residual deflection of a bi-morph leaf when the tracking correction signal $S_0$ is removed. When the tracking correction signal $S_0$ is applied for the first time, and increases to $V_0$, the deflection $\delta$ begins at zero, which represents the "normal" position of the bi-morph leaf, and increases to $\delta_0$. When the tracking correction signal $S_0$ is removed from the bi-morph leaf, a residual deflection $\delta_1$ remains because of mechanical hysteresis. Thus, the next track on the tape 9 traced by that head will be mistracked and the head will pick up a signal from the adjacent track that will show up as noise in the reproduction.

Figure 5:
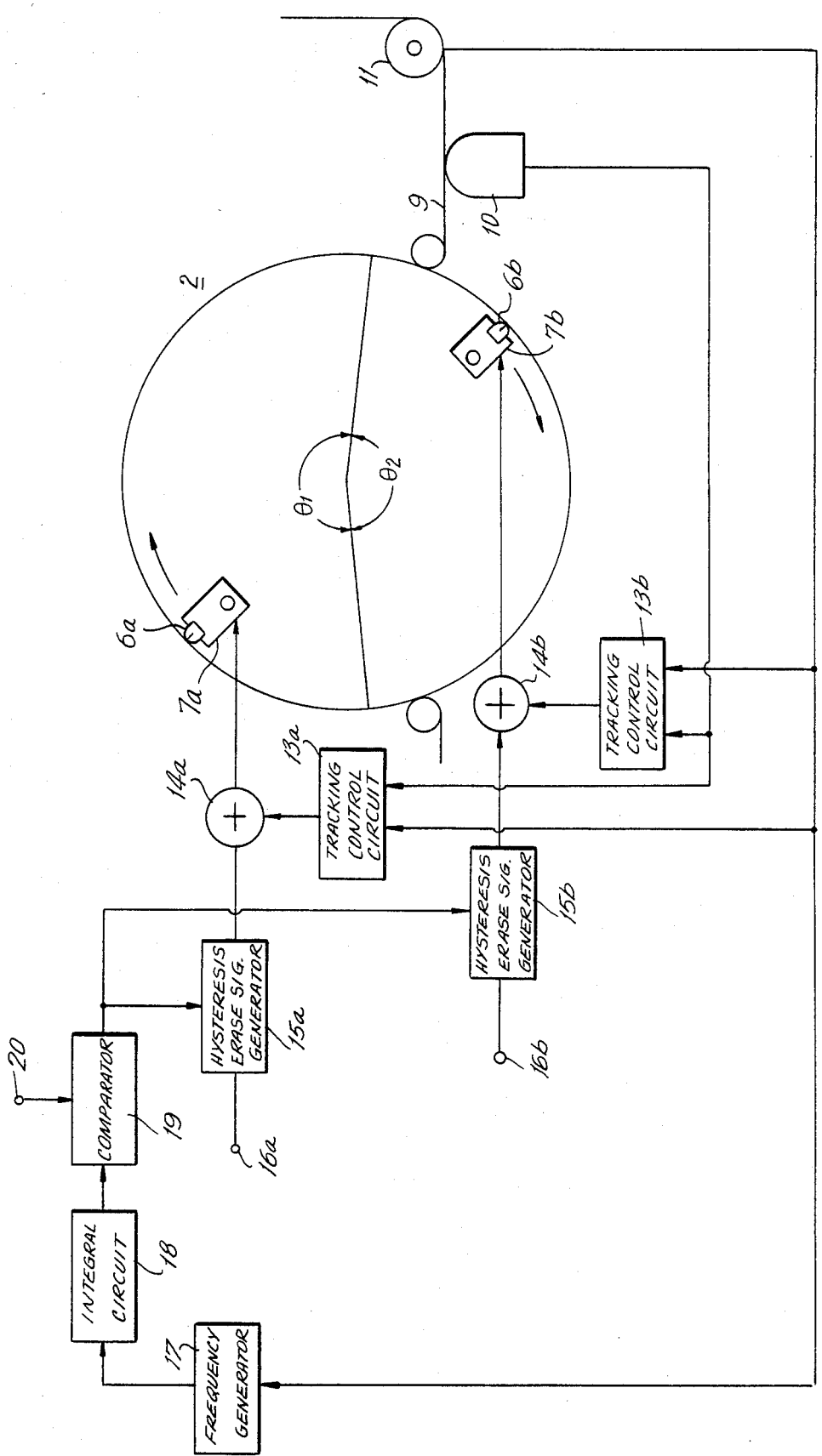
FIG. 5 schematically illustrates a head positioning apparatus for the HVTR shown in FIG. 1 in accordance with the present invention.

FIG. 5 schematically illustrates an HVTR incorporating the head positioning apparatus of the present invention. A tracking correction signal, such as that shown in FIG. 4A, is produced for positioning the bi-morph leaves 7a and 7b by the respective tracking control circuits 13a and 13b in response to inputs from the control head 10 and the tape counter 11. The tracking control circuits 13a and 13b can take any suitable form, an example of which can be found in the above-mentioned U.S. Pat. No. 4,356,522. In accordance with the present invention, the tape counter 11 provides a counter signal to a frequency generator 17. The frequency generator 17 provides a sensing signal with a frequency that is directly proportional to the speed of the tape. An integral circuit 18 receives the signal from the frequency generator and generates a speed detecting signal having a voltage level that is directly proportional to the frequency of the signal from the frequency generator 17. Thus, the voltage level of the speed detecting signal produced by the integral circuit 18 is directly proportional to the speed of the tape 9 being played back. A comparator 19 compares the voltage of the speed detecting signal with a reference voltage applied to the reference input 20 of the comparator 19.

The comparator 19 produces a selecting signal that has a high value (such as a digital "1") when the speed detecting signal is less than the reference voltage and a low value (such as a digital "0") when the speed detecting signal is higher than the reference voltage. The reference voltage is conveniently chosen to correspond to the voltage level produced by the integral circuit 18 when the tape speed is approximately 1.2 times the tape speed during recording. Thus, the selecting signal from the comparator 19 is high when the tape is traveling at a speed less than 1.2 times the recording speed and is low when the tape is traveling at a speed greater than 1.2 times the recording speed.

The head positioning apparatus of the present invention also includes a pair of hysteresis-erase signal generators 15a and 15b that supply hysteresis-erasing signals to the bi-morph leaves 7a and 7b, respectively. The hysteresis-erase signal generators 15a and 15b include trigger signal input terminals 16a and 16b, respectively. The trigger signal input terminals 16a and 16b receive a pulse from a pulse generator (not shown) for initiating the generation of the hysteresis-erase signal at the proper time. The output of the comparator 19 is supplied to both hysteresis-erase signal generators 15a and 15b. The polarity of the hysteresis-erasing signals generated by the hysteresis-erase signal generators 15a and 15b depends on the level of the selecting signal produced by the compartor 19.

The tracking correction signal from the tracking control circuit 13a and the hysteresis-erasing signal from the hysteresis-erase signal generator 15a are provided to an adding circuit 14a. The tracking correction signal from the tracking control circuit 13b and the hysteresis-erasing signal from the hysteresis-erase signal generator 15b are provided to an adding circuit 14b. The outputs of the adding circuits 14a and 14b are provided to the bi-morph leaves 7a and 7b, respectively.

Figure 6:
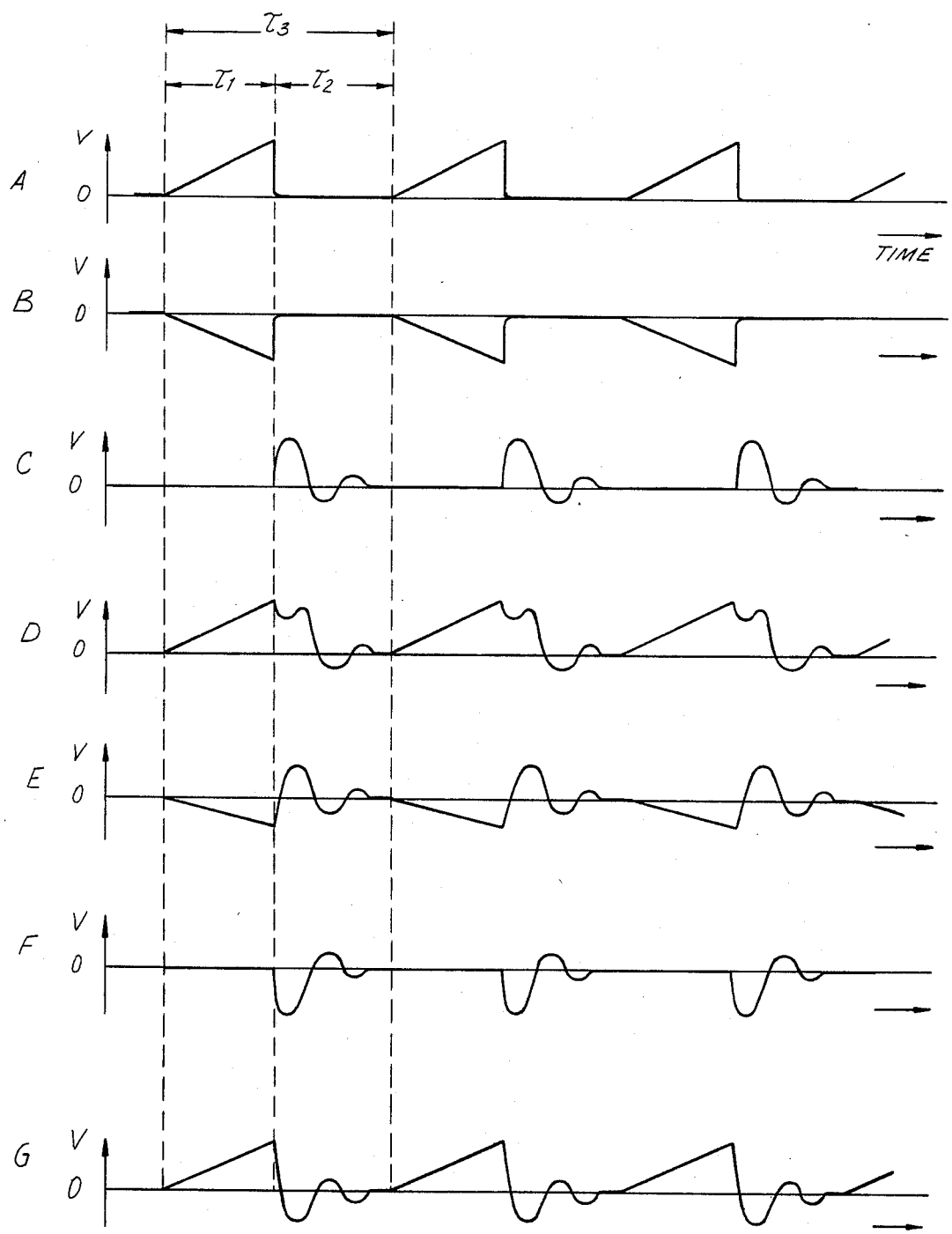
FIGS. 6A-6G illustrate the operation of the head positioning apparatus shown in FIG. 5.

The operation of the head positioning apparatus of the present invention, and its advantages over the prior art, are illustrated in FIGS. 6A–6G. FIG. 6A illustrates the tracking correction signal $S_0$ for one bi-morph leaf, for example bi-morph leaf 7a, when the tape 9 being played back is running at a speed slower than that used in recording. The signal in FIG. 6A can be produced by the apparatus shown in the above-mentioned patent. When the playback speed is greater than that used in recording, the tracking correction signal will have a waveform like that shown in FIG. 6B.

During flyback of each head 6a and 6b, a hysteresis-erasing signal is applied to the bi-morph leaf 7a and 7b mounting the respective head. FIG. 6C illustrates a hysteresis-erasing signal waveform that has been used in the prior art and that is suitable for use with the present invention. It is a generally sinusoidal wave that is triggered when the trace of the head is complete and is amplitude-modulated by a decaying waveform to decay during flyback so that it terminates before the beginning of the next trace of that head. The function of the hysteresis-erasing signal is to return the bi-morph leaves to their "normal" positions before each trace and prevent build-up of residual deflection as shown in FIG. 4B.

In the prior art the hysteresis-erasing signal shown in FIG. 6C has been applied to "erase" the residual deflection of the bi-morph leaves both when the tape speed in playback is slower than that used for recording and when the tape playback speed is faster than that used in recording. However, as seen in FIG. 6D, when the prior art hysteresis-erasing signal is applied to the bi-morph leaf to which the tracking correction signal shown in FIG. 6A has been applied, the addition of the hysteresis-erasing signal to the tracking correction signal results in a waveform that does not effectively remove the residual deflection of the bi-morph leaf. The bi-morph leaf subjected to the waveform shown in FIG. 6D only flexes once, and for an insubstantial time, in a direction opposite to that in which it was deflected to correct tracking error and thus can exhibit some remaining residual deflection.

In accordance with the present invention, the hysteresis-erasing signal shown in FIG. 6C is used when the tape speed in playback is faster than that used for recording. In that case, the selecting signal from the comparator 19 is low and the polarity of the hysteresis-signal generator remains as shown in FIG. 6C. The resulting signal applied to the bi-morph leaf by the adder 14a or 14b is shown in FIG. 6E. As that waveform illustrates, a voltage is twice applied that tends to flex the bi-morph leaf opposite to the direction of deflection during tracking correction. When the tape speed in playback is slower than that used in recording, the selecting signal from the comparator 19 is at a high level. The polarity of the hysteresis-erasing signal is reversed and assumes the waveform shown in FIG. 6F. The resultant waveform applied to the bi-morph leaf from the adder 14a and 14b is shown in FIG. 6G. As FIG. 6G shows, the hysteresis-erasing signal applied to the bi-morph leaf tends to deflect the bi-morph leaf twice in the direction opposite to that caused by the tracking correction signal. Thus, the bi-morph leaf is always flexed for a substantial time in a direction opposite to the deflection caused by the tracking correction signal.

Figure 7:
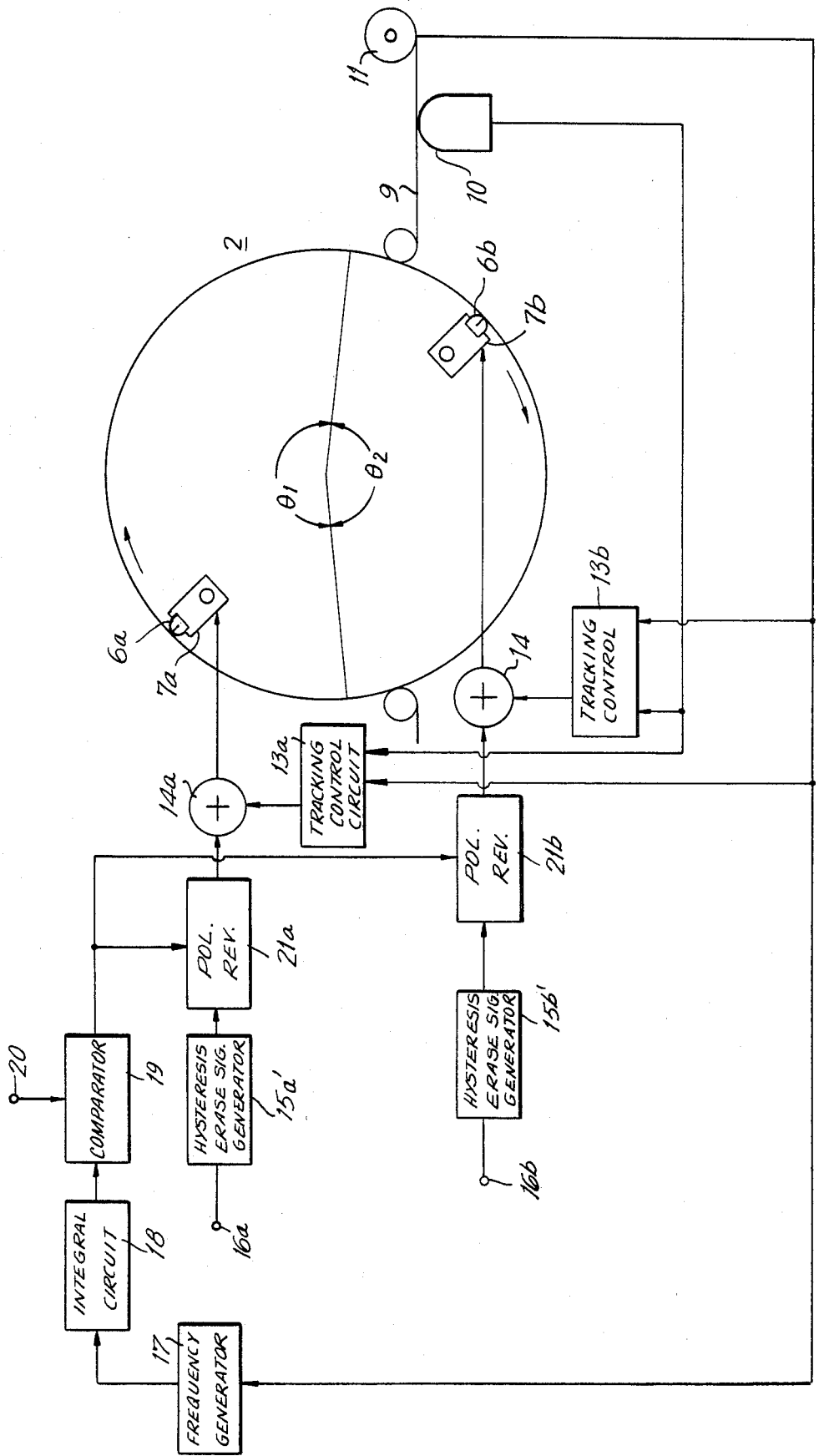
FIG. 7 schematically illustrates an alternate embodiment of a head positioning apparatus in accordance with the present invention.

FIG. 7 shows an alternate embodiment of the present invention. In the embodiment shown in FIG. 7, polarity reversing circuits 21a and 21b are provided between the respective hysteresis-erase signal generators 15a' and 15b' and the adding circuits 14a and 14b. The hysteresis-erase signal generators 15a' and 15b' generate the signal illustrated in FIG. 6C when a pulse is applied to the respective triggering signal inputs 16a and 16b. The comparator 19 provides the selecting signal to the polarity reversing circuits 21a and 21b. When the selecting signal is low, the polarity reversing circuits are inactive and the hysteresis-erasing signal shown in FIG. 6C is fed to the adding circuits 14a and 14b. However, if the selecting signal is high, indicating a slow playback mode, the polarity reversing circuits 21a and 21b are activated and the hysteresis-erasing signal assumes the form shown in FIG. 6F. The resulting signals applied to the bi-morph leaves are the same as those illustrated in FIGS. 6E and 6G.

Although the present invention has been described in connection with two illustrative embodiments, those of oridinary skill in the art will recognize various changes and modifications that can be made without departing from the spirit of the invention. Therefore, the scope of the present invention is intended to be defined solely by the appended claims.

What is claimed is:

1. A head positioning apparatus for a helical-scan tape reproducing device having a rotary transducer for reproducing signals from tracks on a record medium, electrically deflectable mounting means mounting the rotary transducer and positioning signal generating means for applying a positioning electrical signal to the mounting means for deflection thereof, the head positioning apparatus comprising:

hysteresis-erase signal means for applying a hysteresis-erasing electrical signal to the mounting means for deflection thereof to remove residual deflection resulting from deflection by said positioning signal means; and polarity selecting means for selecting the polarity of said hysteresis-erasing signal depending on the direction of deflection of said mounting means by said positioning signal.

2. The head positioning apparatus of claim 1; wherein said polarity selecting means includes means for generating a selecting signal having a first value when the record medium is travelling faster than a predetermined speed relative to that at which it was recorded and a second value when the record medium is travelling slower than said predetermined speed, and said hysteresis-erase signal means is reponsive to said selecting signal for providing said hysteresis-erasing signal with one polarity when said selecting signal has said first value and a reversed polarity when said selecting signal has said second value, whereby said electrically deflectable mounting means is flexed at least twice in the direction opposite to the deflection caused by said positioning signal.

3. The head positioning apparatus of claim 2; further comprising speed detecting means including speed sensing means for providing a sensing signal having a frequency determined by the speed of said record medium, and integral circuit means for providing a speed detection signal at a level determined by the frequency of said sensing signal; and wherein said means for generating a selecting signal includes comparator means for providing said second value of said selecting signal when said level of the speed detection signal is below a predetermined reference level and providing said first value of said selecting signal when said level of the speed detection signal is above said predetermined reference level.

4. The head positioning apparatus of claim 2; wherein said hysteresis-erase signal means is adapted to selectively generate a first erasing signal having a substantially sinusoidal first waveform amplitude-modulated by a decaying waveform and a second erasing signal having a second waveform the polarity of which is reversed from that of said first waveform and at the same frequency as said first waveform and amplitude modulated by said decaying waveform, and said polarity selecting means is adapted to provide said first waveform when said selecting signal has said first value and said second waveform when said selecting signal has said second value.

5. The head positioning apparatus in claim 2; wherein said hysteresis-erase signal means includes a hysteresis-erase signal generator for generating a hysteresis-erasing signal having a predetermined polarity, and polarity reversing means for reversing the polarity of said hysteresis-erasing signal in response to said second value of said selecting signal.

6. The head positioning apparatus in claim 1; wherein said positioning signal means is adapted to supply a tracking correction signal to the mounting means only while the transducer is tracing a track on the medium, and said hysteresis-erase signal means is triggered when the transducer completes tracing a track on the medium and decays before said transducer returns to a position for tracking the next track on the medium; and further comprising adder means for adding said positioning signal and said hysteresis-erase signal.

7. A helical-scan video tape recording/reproducing device comprising:

first and second transducers mounted on a rotatable drum for tracing tracks on a magnetic medium during approximately one half of each revolution of each transducer;

first and second electrically deflectable mounting means by which said first and second transducers, respectively, are mounted on said drum;

positioning signal generating means for generating a positioning signal for application to said electrically deflectable mounting means for deflection thereof to position each of said transducers during said one half of each revolution thereof;

hysteresis-erase signal means for generating a hysteresis-erasing signal for application to said electrically deflectable mounting means during the other half of each revolution of said transducers;

adding means for adding said positioning signal and said hysteresis-erasing signal for continuous application to said mounting means; and polarity selecting means for selecting the polarity of said hysteresis-erasing signal so as to flex said mounting means during said other half of each revolution at least twice in the direction opposite to the direction of said deflection caused by said positioning signal.

* * * * *